Feb. 21, 1967 C. M. LEAR 3,305,621

FORCED COOLED ISOLATED PHASE BUS HAVING DEIONIZING MEANS COMPRISING SPACED THERMALLY CONDUCTIVE PLATES WITH ROTATABLE VANE MEMBERS DISPOSED THEREIN

Filed Oct. 29, 1964 3 Sheets-Sheet 1

WITNESSES

Theodore F. Wrobel

James F. Young

INVENTOR

Charles M. Lear

BY

Clement L. McHale

ATTORNEY

Feb. 21, 1967 C. M. LEAR 3,305,621

FORCED COOLED ISOLATED PHASE BUS HAVING DEIONIZING MEANS COMPRISING SPACED THERMALLY CONDUCTIVE PLATES WITH ROTATABLE VANE MEMBERS DISPOSED THEREIN

Filed Oct. 29, 1964

3 Sheets-Sheet 3

United States Patent Office 3,305,621

Patented Feb. 21, 1967

3,305,621

FORCED COOLED ISOLATED PHASE BUS HAVING DEIONIZING MEANS COMPRISING SPACED THERMALLY CONDUCTIVE PLATES WITH ROTATABLE VANE MEMBERS DISPOSED THEREIN

Charles M. Lear, Washington, Pa., assignor to Westinghouse Electric Corporation, Pittsburgh, Pa., a corporation of Pennsylvania Filed Oct. 29, 1964, Ser. No. 407,348

10 Claims. (Cl. 174—16)

This invention relates to bus structures and more particularly to isolated phase bus structures of the forced cooled type.

In order to construct a bus structure of the isolated phase type which has a relatively high current rating and which has a relatively compact construction, particularly where the available space may limit the maximum size of the equipment, forced circulation of a cooling fluid may be employed to avoid overheating of at least certain portions of the bus structure. When isolated phase bus equipment is forced cooled and an abnormal operating condition, such as a fault, occurs which results in the formation of an ionized fluid, such as a gas, in one portion of the equipment, it is essential that the ionized fluid be deionized before the ionized fluid is circulated into other portions of the equipment to thereby prevent further damage or operating difficulties with other portions of the equipment. In addition, it is necessary that some means be provided as part of the isolated phase bus equipment to control the flow of the cooling fluid and produce the desired cooling in all portions of the equipment. It is therefore desirable to provide an improved means for both deionizing any ionized fluid which may result during the operation of isolated phase bus equipment and also to provide an improved means for controlling the flow of a cooling fluid in an isolated phase bus equipment of the forced cooled type.

An object of this invention is to provide an improved isolated phase bus structure of the forced cooled type.

Another object of this invention is to provide a combined fluid flow control and deionizing means for isolated phase bus.

A further object of this invention is to provide an improved means for controlling fluid flow between the different portions of a forced cooled, isolated phase bus structure.

Other objects of the invention will, in part, be obvious and will, in part, appear hereinafter.

For a fuller understanding of the nature and objects of the invention, reference should be had to the following detailed description taken in conjunction with the accompanying drawings in which.

Figure 1:
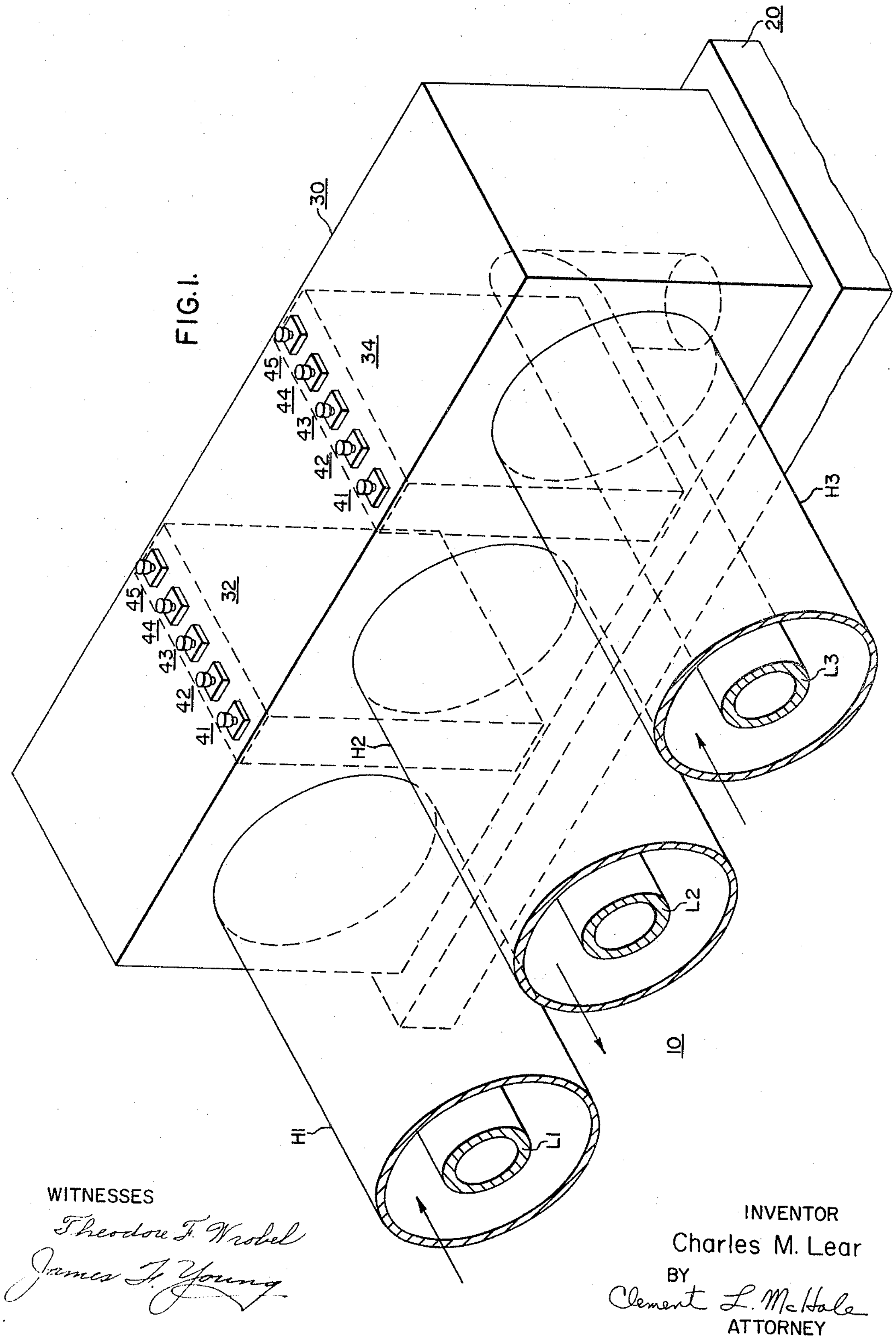
FIGURE 1 is an isometric view of a three phase bus structure embodying the principal features of the invention.
Figure 2:
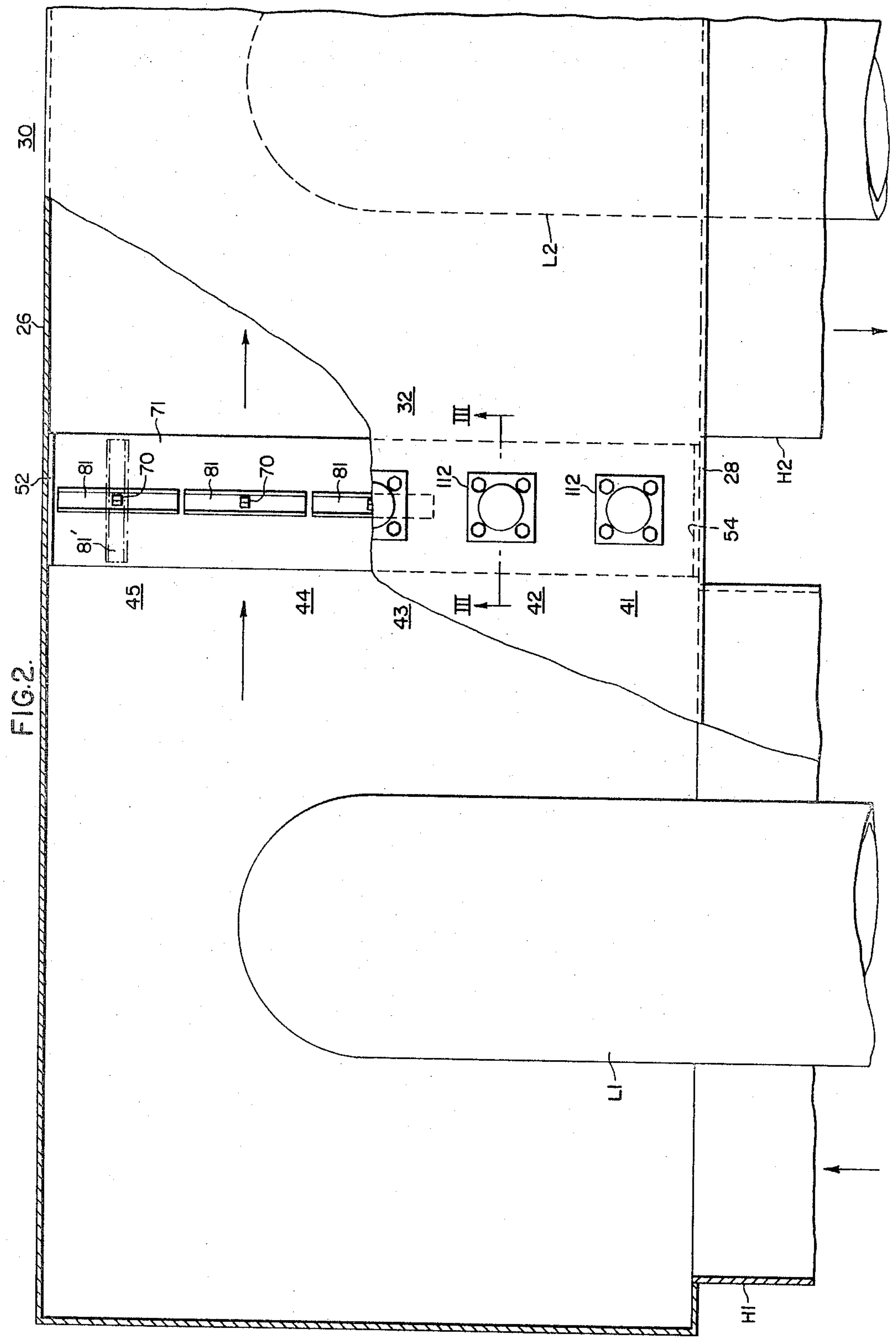
FIG. 2 is an enlarged view, partly in plan and partly broken away, of a portion of the structure shown in FIG. 1.

Referring now to the drawings and particularly to FIGS. 1 and 2, there is illustrated a three-phase isolated phase bus structure 10 which may be employed to electrically interconnect an electric apparatus, such as a transformer, as indicated at 20 and another electrical apparatus, such as a generator (not shown), or a source of electric power. The three phases of the bus structure 10 comprise the spaced bus conductors L1, L2 and L3, and the associated housings H1, H2 and H3 for enclosing the conductors L1, L2 and L3, respectively. The conductors L1, L2 and L3 are supported within the associated housings by suitable supporting means such as the spaced insulating supports or insulators (not shown) as described in detail in copending application Ser. No. 407,347, filed Oct. 29, 1964, by Arthur B. Niemoller which is assigned to the same assignee as the present application. It is to be noted that the space between each of the conductors L1, L2 and L3 and the associated housing is substantially filled with a suitable insulating fluid, such as air or other insulating gas. The housings H1, H2 and H3 are preferably formed from a suitable non-magnetic, electrically conducting material such as aluminum, in order to magnetically shield the magnetic fluxes which are produced when current flows in the conductors L1, L2 and L3, to insure the safety of operating personnel and to prevent the occurrence of a line to line or phase to phase fault condition.

In order to prevent overheating of different portions of the bus structure 10 or to limit the temperature rises of different portions of said bus structure to predetermined values when the conductors L1, L2 and L3 are carrying relatively high currents, air or other cooling fluid is forced to flow through each of the housings H1, H2 and H3 as indicated by the arrows in FIG. 1 by any suitable means (not shown), such as a fan or blower. In this instance, the cooling fluid or air is illustrated as being forced toward the right as viewed in FIG. 1 in the outer housings H1 and H3 and returning to the fluid circulating means through the intermediate or center housing H2 toward the left, as viewed in FIG. 1. It is to be understood that a suitable heat exchanging means may be provided in the fluid flow path through the bus structure 10 at a location remote from heat shown in FIG. 1 prior to the re-introduction of the cooling fluid into the outer housings H1 and H3 after the cooling fluid returns to the fluid circulating means through the intermediate housing H2.

In order to permit the cooling fluid to flow between the outer housings H1 and H3 and the intermediate housing H2 as best shown in FIG. 1, the duct means or interconnecting compartment 30 is provided to interconnect the interiors of the housings H1, H2 and H3 at the point where the cooling fluid passes or flows from the outer housings H1 and H3 into the intermediate housing H2. The duct means 30 is also preferably formed from a suitable non-magnetic, electrically conducting material, such as aluminum, in order to magnetically shield the magnetic fluxes which are produced by current flow in the conductors L1 and L2 and L3 as said conductors pass through the duct means 30 and are then electrically connected to the electrical apparatus indicated at 20. It is to be noted that the duct means 30 provides a substantially closed fluid flow path between the housings H1, H2 and H3.

In order to prevent the flow of ionized gases from one of the housings H1, H2, H3 into either of the other housings and to control the flow of the cooling fluid between the outer housings H1 and H3 and the intermediate housing H2, the combined fluid flow control and deionizing means or assemblies 32 and 34 are disposed in the duct means 30 between the housings H1 and H2 and between the housings H2 and H3, respectively, as best shown in FIG. 1. If an abnormal operating condition, such as a fault, occurs in one of the housings H1, H2 or H3 which results in the formation of an ionized fluid or gas, one important function of each of the control means 32 and 34 is to subdivide and cool any ionized fluid which passes therethrough to thereby substantially deionize any such ionized fluid and prevent further damage or operating difficulties which might otherwise result if such ionized fluid were permitted to flow into one of the other housings.

Figure 3:
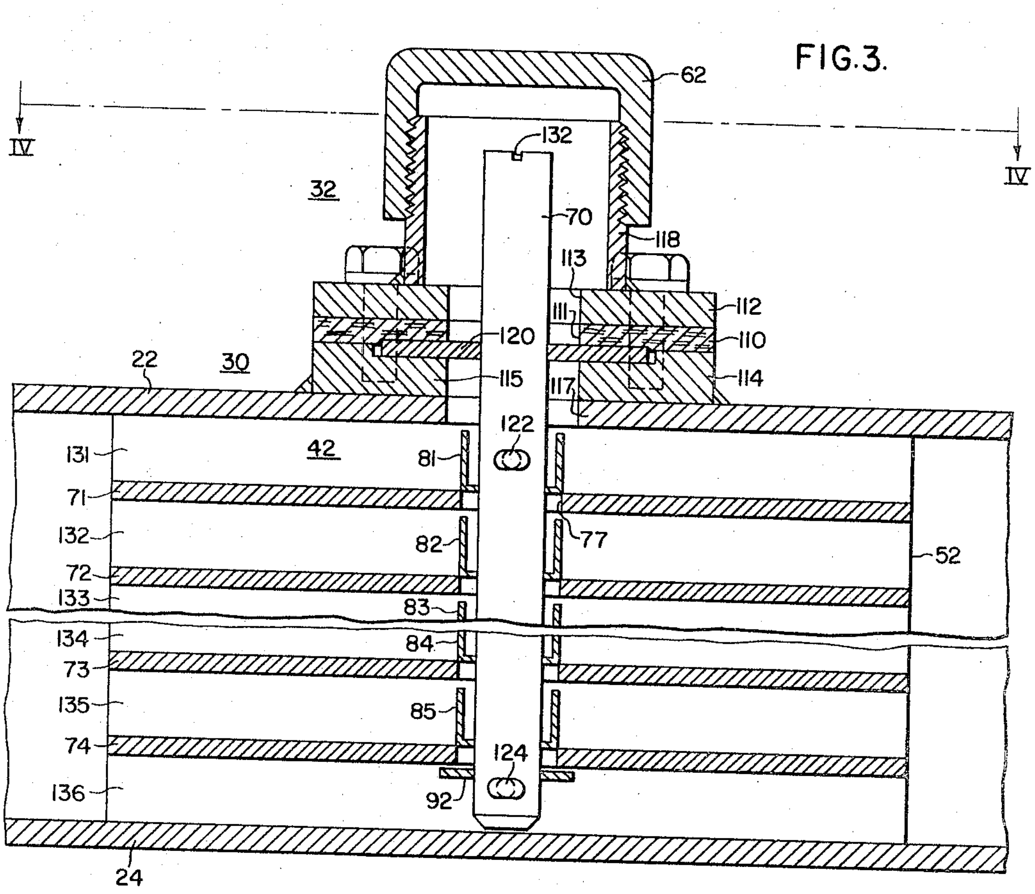
FIG. 3 is an enlarged view, partly in section and partly in elevation, taken along the line III—III in FIG. 2 of a combined fluid flow control and deionizing means utilized in the bus structure.
Figure 4:
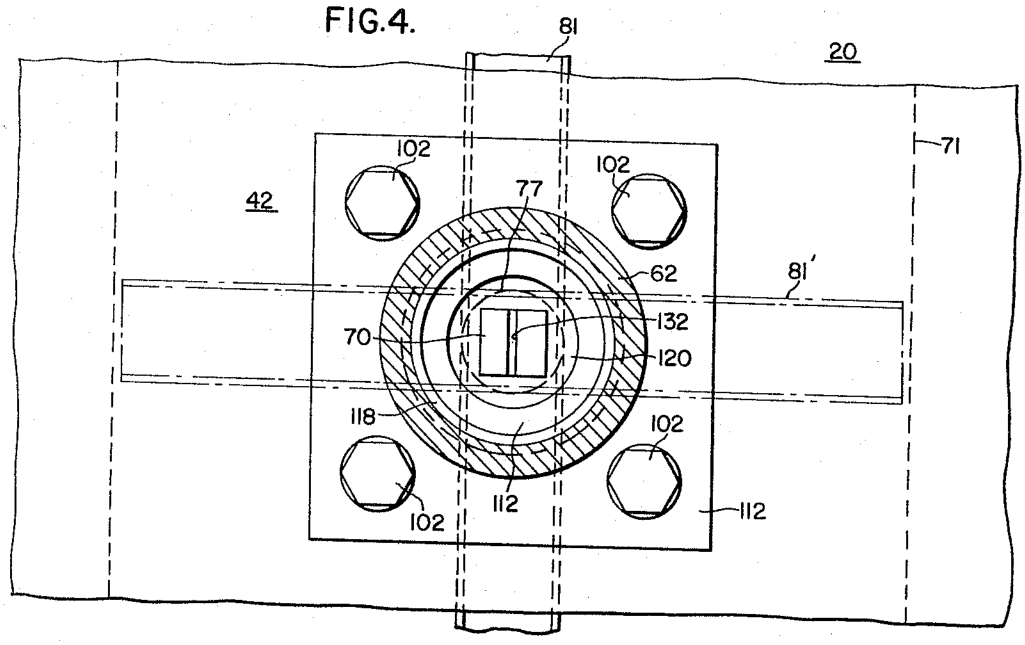
FIG. 4 is an enlarged view, partly in plan and partly in section, of the structure shown in FIG. 3.

As best shown in FIGS. 2 and 3, each of the combined fluid flow control and interphase deionizing means 32 and 34 comprises a plurality of spaced plates, as indicated at 71 through 74 in FIG. 3, to define a plurality of fluid passageways therebetween, as indicated at 131 through 136 in FIG. 3 between the top portion 22 and the bottom portion 24 of the duct means 30. It is to be noted that the plates 71 through 74 are generally rectangular in configuration and disposed substantially parallel to the flow of the cooling fluid between the adjacent housings and are preferably formed from a thermally conductive or heat absorbing material, such as aluminum. As best shown in FIG. 2, the width of each of the plates 71 through 74 is substantially equal to the lateral spacing between the adjacent housings H1 and H2 in order to maintain at predetermined values the electrical insulating clearances between the control means 32 and 34, which along with the duct means 30 and the housings H1, H2 and H3 are normally maintained at ground or substantially zero potential, while the phase conductors L1, L2 and L3 are normally at a relatively high potential, such as 15 kv. or higher. In order to support the plates 71 through 74 in spaced relationship within the duct means 30 and to permit preassembly of the plates which make up each of the control means 32 and 34, the plates 71 through 74 may be secured to the vertical end plates 52 and 54, as shown in FIGS. 2 and 3 by any suitable means, such as welding or brazing, and the end plates 52 and 54 may, in turn, be secured to the side-wall portions 26 and 28, respectively, of the duct means 30 by suitable means such as welding bolts or brazing.

In order to vary or control the effective size of the passageways provided through each of the control means 32 and 34, each of the control means 32 and 34 includes a plurality of damper or fluid flow control means 41 through 45. Each of the control means 41 through 45 includes a plurality of vane members or elongated closing members 81 through 85 as required in a particular application in accordance with the number of plates or passageways provided, which are disposed between the plates 71 through 74 and between the top portion 22 of the duct means 30 and the plate 71, as shown in FIG. 3. As illustrated, the closing members 81 through 85 may be channel shaped in configuration with the closing members 81 through 85 of each of the respective control means 41 through 45 being vertically aligned and simultaneously actuable or rotatable in place by a control shaft 70 which, in this instance, has a rectangular or square cross-section. The shaft 70 passes through openings of a corresponding shape in each of the associated closing members 81 through 85 through which each control shaft 70 vertically extends across the vertical dimension of the duct means 30, as shown in FIG. 3, with one end of each control shaft 70 being accessible externally of the duct means 30. Each of the plates 71 through 74 through which each of the control shaft 70 passes includes an opening, as indicated at 77 in FIG. 3 for the plate 71, to freely permit the rotation of the control shaft 70 and the rotation of the associated closing members 81 to 85. The lower end of the control shaft 70 of each of the control means 41 through 45 rests on the bottom portion 24 of the duct means 30 which acts as a bearing surface for each of the control shafts 70. In order to maintain the control shaft 70 in an assembled relationship with the associated closing members 81 through 85 and the plates 71 to 74, suitable means such as the cotter pins 122 and 124 may be disposed to pass through openings in each of the associated control shafts 70 above and below the associated closing members 81 through 85, respectively, along with the washer member 92 which is disposed on each shaft 70 below the plate 74 and includes an opening therethrough having a shape corresponding to the cross-section of the control shaft 70. In order to permit adjustment of the closing members 81 through 85 associated with each of the control shafts 70, each control shaft 70 includes a slot 132 adapted to receive a suitable wrench. The slot 132 on each shaft 70 substantially aligned with the positions of the associated closing members 81 to 85. It is to be noted that the total length of the closing members disposed in each of the passageways 131 to 136 is substantially equal to the length of the associated plates 71 to 74 and that the total length extends substantially across the duct means 30. It is also to be noted that the length of each of the closing members 81 through 85 is no greater than the width of the associated plates 71 through 74 to thereby maintain the required electrical insulating clearance between each of the control means 32 and 34 and the adjacent phase conductors L1, L2, and L3, as previously mentioned.

In order to releasably retain or lock each of the control shafts 70, along with the associated closing members 81 through 85, in predetermined positions, a retaining or locking means is provided which includes the retaining ring or plate 120 which is disposed around each control shaft 70 as it leaves the duct means 30. Each of the retaining rings 120 includes a central opening therethrough having a shape which corresponds with the cross-section of the associated control shaft 70. The first and second clamping plates 112 and 114, respectively, are disposed on opposite sides of the retaining ring 120, as shown in FIG. 3, with the lower clamping plate 114 being secured to the top portion 22 of the duct means 30 by suitable means, such as welding. A gasket member 110 is disposed between the upper clamping plate 112 and the retaining ring 120 and the lower clamping plate 114 and is formed from a suitable resilient material such as cork neoprene. In order to lock each control shaft 70 in a predetermined position, the bolts 102 are provided to secure the upper clamping plate 112 to the lower clamping plate 114. When the bolts 102 are tightened, the retaining ring 120 along with the associated control shaft 70 is prevented from rotating or moving from a predetermined position to thereby retain the associated closing members 81 through 85 in predetermined operating positions. It is to be noted that the clamping plates 112 and 114 include the central openings 113 and 115, respectively, which permit the rotation of each control shaft 70 when the bolts 102 are loosened.

In order to prevent the entrance of contaminating atmosphere or dirt along each of the control shafts 70, a sleeve member 118 is secured to the top or upper clamping plate 112 by any suitable means, such as welding, to surround the associated control shaft 70 and a closing end cap 62 is releasably secured to the sleeve member 118 by a threaded connection, as indicated in FIG. 3.

In the operation of each of the control means 32 and 34, when the control shafts 70 are rotated to the positions which correspond to the operating position of the control means as indicated at 81' in phantom in FIG. 2 for the closing member 81, the cooling fluid is permitted to flow between the adjacent housing H1 and H2 at the maximum rate since the closing members 81 through 85 are substantially parallel to the direction of fluid flow. When the control shafts 70 are rotated to positions which correspond to the positions of the closing members 81, as indicated in FIG. 2, which are substantially transverse or perpendicular to the direction of fluid flow between the housings H1 and H2, the fluid flow rate is reduced to substantially 10% of the maximum fluid flow rate permitted when the closing members 81 through 85 are substantially parallel to the direction of fluid flow between the adjacent housings H1 and H2. Each of the control shafts 70 can be individually and continuously adjusted to any fluid flow rate between the maximum and minimum flow rates just indicated and retained in predetermined operating positions as required by operating conditions by the retaining means previously described. In the overall operation of the bus structure 10, each of the control means 32 and 34 can be individually adjusted to vary the fluid pressure drop in each of said control means and to substantially balance the cooling which results in the different housings H1, H2 and H3 which may be of different lengths or configurations in a particular application thus causing different fluid pressure drops in the different housings or to vary the cooling in the different housings as may be desired for particular operating conditions.

In the operation of the bus structure 10 when an abnormal operating condition, such as a fault or insulation failure, occurs in one of the housings H1, H2 or H3 which results in the formation of an ionized fluid or gas, the ionized fluid will be subdivided and cooled when the ionized fluid reaches one of the fluid flow control and deionizing means 32 or 34 to thereby prevent the flow of an ionized fluid into the other housings which would otherwise be subjected to the risk of further damage or operating difficulties. Each of the plates 71 through 74 which make up each of the control means 32 and 34 will temporarily absorb heat from the ionized fluid as it passes through one of the control means 32 or 34 and substantially deionize any ionized fluid which might otherwise flow or travel to one of the adjacent housings.

It is to be understood that in certain applications the pattern of fluid flow may be varied from that disclosed in that fluids may be forced circulated either between the phase conductors and the associated housing or inside the phase conductors or flow from the intermediate housing to the outer housing rather than in the directions as disclosed. It is to be understood that other configurations, such as a bar or rod, may also be employed for the closing members 81 through 85, as disclosed, rather than the channel configuration, as illustrated, as long as the height or thickness of the closing member is substantially equal to the thickness of the space of the associated fluid passageway in which the closing members are disposed. It is also to be understood that the invention may be employed in other than three phase applications. For example, in a single phase application, power may be supplied to electrical apparatus such as a transformer through two conductors each surrounded by its own housing and including a cooling fluid passes between the two housings.

The apparatus embodying the teachings of this invention has several advantages. For example, an improved combined fluid flow control and deionizing means is disclosed which maintains the necessary electrical insulating clearances between the adjacent parts of the structure which are maintained normally at a high potential. In addition, the fluid flow control means as disclosed is readily adjustable with the adjusting means mounted on any wall portion of the duct means 30. In addition, the fluid flow control means as disclosed is readily adjustable from externally of the closed housing or compartments in which the phase conductors are disposed.

Another important advantage of the combined fluid flow control and deionizing means disclosed is that the plates 81 through 85 which are preferably formed from a material such as aluminum which is both electrically and thermally conducting assist in the magnetic shielding between the conductors L1, L2 and L3. In particular, the plates 81 and 85 form continuous electrically conducting paths with the respective housings H1, H2 and H3 to extend the interphase magnetic shielding provided by said housings into the duct means 30 up to the point of electrical connection with the associated electrical apparatus 20.

Since numerous changes may be made in the above described apparatus, and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. An isolated phase bus structure comprising a plurality of spaced conductors, a separate housing spaced from and enclosing each conductor, duct means for interconnecting the interiors of said housings to permit the flow of a cooling fluid therebetween, and deionizing means disposed in said duct means between the adjacent housings, said deionizing means comprising a plurality of spaced thermally conductive plates which define a plurality of fluid passageways therebetween and a plurality of movable vane members disposed in said passageways to vary the effective size of said passageways.

2. An isolated phase bus structure comprising a plurality of spaced conductors, a separate housing spaced from and enclosing each conductor, duct means for interconnecting the interiors of said housings to permit the flow of a cooling fluid therebetween, and deionizing means disposed in said duct means between the adjacent housings, said deionizing means comprising a plurality of spaced thermally conductive plates which define a plurality of fluid passageways therebetween and a plurality of rotatable vane members disposed in said passageways to vary the effective size of said passageways, said vane members being channel-shaped in configuration.

3. An isolated phase bus structure comprising a plurality of laterally spaced conductors, a separate housing spaced from and enclosing each conductor, duct means interconnecting the interiors of adjacent housings to permit the flow of a cooling fluid therebetween, and fluid flow control means disposed in said duct means comprising a plurality of spaced plates disposed generally parallel to the flow of cooling fluid between adjacent housings to define a plurality of fluid passageways, and a plurality of movable elongated members disposed in the respective passageways and having a thickness slightly less than that of the associated passageway, said plates being formed of a heat absorbing material to substantially deionize any ionized fluid which passes through said fluid control means.

4. An isolated phase bus structure comprising a plurality of laterally spaced conductors, a separate housing spaced from and enclosing each conductor, duct means interconnecting the interiors of adjacent housings to permit the flow of a cooling fluid therebetween, and fluid flow control means disposed in said duct means comprising a plurality of spaced plates disposed generally parallel to the flow of cooling fluid between adjacent housings to define a plurality of fluid passageways, a plurality of movable elongated members disposed in the respective passageways and having a thickness slightly less than that of the associated passageway, said plates being formed of a heat absorbing material to substantially deionize any ionized fluid which passes through said fluid control means, and control means operatively connected to said elongated members and extending substantially across said duct means for varying the positions of said elongated members with respect to said passageways with a portion of said control means being accessible externally of said duct means.

5. An isolated phase bus structure comprising a plurality of laterally spaced conductors, a separate housing spaced from and enclosing each conductor, duct means for laterally interconnecting the interiors of of the adjacent housings to permit the flow of a cooling fluid therebetween, a plurality of generally rectangular, spaced, thermally conductive plates disposed in said duct means to define a plurality of fluid passageways between said plates for substantially deionizing any fluid which flows between the adjacent housings, each plate having a width extending transversely for only a portion of the distance between the adjacent conductors and a length extending substantially across said duct means, and a plurality of elongated closing members disposed in each passageway and having a total length substantially equal to the length of the adjacent plates, the length of each closing member being no greater than the width of the adjacent plates and rotatable in place to vary the effective size of the associated passageway.

6. An isolated phase bus structure, comprising a plurality of laterally spaced conductors, a separate housing spaced from and enclosing each conductor, duct means for laterally interconnecting the interiors of the adjacent housings to permit the flow of a cooling fluid therebetween, a plurality of generally rectangular, spaced, thermally conductive plates disposed in said duct means to define a plurality of fluid passageways between said plates for substantially deionizing any fluid which flows between the adjacent housings, each plate having a width extending transversely for only a portion of the distance between the adjacent conductors and a length extending substantially across said duct means, a plurality of elongated closing members disposed in each passageway and having a total length substantially equal to the length of the adjacent plates, the length of each closing member being no greater than the width of the adjacent plates and rotatable in place to vary the effective size of the associated passageway, and a shaft extending substantially across said duct means for rotatably actuating a plurality of closing members and having one end accessible externally of said duct means.

7. A three phase isolated phase bus structure comprising three laterally spaced conductors, a separate housing spaced from and enclosing each conductor, duct means extending laterally between the adjacent housings for interconnecting the interiors of said housing to permit the flow of a cooling fluid between said housings, and first and second fluid flow control means disposed in the duct means between the respective housings to control the fluid flow between the adjacent housings, said fluid flow control means each comprising a plurality of spaced plates disposed generally parallel to the fluid flow between said housings to define a plurality of fluid passageways between said plates and a plurality of rotatable, enlongated members disposed in the respective passageways to control the fluid flow between the respective housings, said plates being formed of a heat absorbing material to substantially deionize any ionized fluid which passes through said fluid flow control means.

8. A three phase isolated phase bus structure comprising three laterally spaced conductors, a separate housing spaced from and enclosing each conductor, duct means extending laterally between the adjacent housings for interconnecting the interiors of said housing to permit the flow of a cooling fluid between said housings, and first and second fluid flow control means disposed in the duct means between the respective housings to control the fluid flow between the adjacent housings, said fluid flow control means each comprising a plurality of spaced plates disposed generally parallel to the fluid flow between said housings to define a plurality of fluid passageways between said plates, a plurality of rotatable, elongated members disposed in the respective passageways to control the fluid flow between the respective housings, said plates being formed of a heat absorbing material to substantially deionize any ionized fluid which passes through said fluid flow control means, and one or more control shafts extending substantially across said duct means and being operatively connected to a plurality of said elongated members to control the position thereof with respect to the associated passageways, one end of each control shaft being accessible externally of said duct means.

9. An isolated phase bus structure comprising a plurality of laterally spaced conductors, a separate housing spaced from and enclosing each conductor, duct means for laterally interconnecting the interiors of the adjacent housings to permit the flow of a cooling fluid therebetween, a plurality of generally rectangular, spaced, thermally conductive plates disposed in said duct means to define a plurality of fluid passageways between said plates for substantially deionizing any fluid which flows between the adjacent housings, each plate having a width extending transversely for only a portion of the distance between the adjacent conductors and a length extending substantially across said duct means, a plurality of elongated closing members disposed in each pasasgeway and having a total length substantially equal to the length of the adjacent plates, the length of each closing member being no greater than the width of the adjacent plates and rotatable in place to vary the effective size of the associated passageway, and a plurality of spaced control shafts each extending through said plates substantially across said duct means to engage a plurality of corresponding closing members in successive passageways, one end of each control shaft being accessible externally of said duct means to permit simultaneous adjustment of the positions of the associated closing members with respect to the associated passageways.

10. An isolated phase bus structure comprising a plurality of laterally spaced conductors a separate housing spaced from and enclosing each conductor, duct means for laterally interconnecting the interiors of the adjacent housings to permit the flow of a cooling fluid therebetween, a plurality of generally rectangular, spaced, thermally conductive plates disposed in said duct means to define a plurality of fluid passageways between said plates for substantially deionizing any fluid which flows between the adjacent housings, each plate having a width extending transversely for only a portion of the distance between the adjacent conductors and a length extending substantially across said duct means, a plurality of elongated closing members disposed in each passageway and having a total length substantially equal to the length of the adjacent plates, the length of each closing member being no greater than the width of the adjacent plates and rotatable in place to vary the effective size of the associated passageway, and a plurality of spaced control shafts each extending through said plates substantially across said duct means to engage a plurality of corresponding closing members in successive passageways, one end of each control shaft being accessible externally of said duct means to permit simultaneous adjustment of the positions of the associated closing members with respect to the associated passageways, each closing member being channel-shaped in configuration.

References Cited by the Examiner

UNITED STATES PATENTS

| | | | |
|---|---|---|---|
| 2,861,119 | 11/1958 | Collonge | 174—16 |
| 2,878,300 | 3/1959 | Rugg | 174—68 |
| 2,992,290 | 7/1961 | Swerdlow | 174—16 |

LEWIS H. MYERS, *Primary Examiner.*

J. F. RUGGIERO, *Assistant Examiner.*